United States Patent
Saily et al.

(10) Patent No.: US 10,925,107 B2
(45) Date of Patent: Feb. 16, 2021

(54) FAST ACTIVATION OF MULTI-CONNECTIVITY UTILIZING UPLINK SIGNALS

(71) Applicant: Nokia Technologies Oy, Espoo (FI)

(72) Inventors: Mikko Saily, Helsinki (FI); Tommi Jokela, Helsinki (FI)

(73) Assignee: Nokia Technologies Oy, Espoo (FI)

(*) Notice: Subject to any disclaimer, the term of this patent is extended or adjusted under 35 U.S.C. 154(b) by 457 days.

(21) Appl. No.: 15/293,795

(22) Filed: Oct. 14, 2016

(65) Prior Publication Data

US 2018/0110082 A1    Apr. 19, 2018

(51) Int. Cl.
*H04W 76/27* (2018.01)
*H04W 76/15* (2018.01)
(Continued)

(52) U.S. Cl.
CPC .......... *H04W 76/27* (2018.02); *H04W 36/30* (2013.01); *H04W 74/0833* (2013.01);
(Continued)

(58) Field of Classification Search
CPC . H04W 76/27; H04W 74/0833; H04W 88/06; H04W 76/25; H04W 76/15;
(Continued)

(56) References Cited

U.S. PATENT DOCUMENTS

2008/0130588 A1* 6/2008 Jeong .................. H04W 74/002
370/335
2010/0329188 A1* 12/2010 Jen ....................... H04B 7/2606
370/328
(Continued)

FOREIGN PATENT DOCUMENTS

| CN | 104469945 A | 3/2015 |
| CN | 104823473 A | 8/2015 |
| WO | WO-2014/088295 A1 | 6/2014 |

OTHER PUBLICATIONS

Brenner, Michael et al: The Open Mobile Alliance, https://metis-ii.5g-ppp.eu/wp-content/uploads/deliverables/METIS-II_D6.2.V1.0.pdf; Apr. 30, 2017 [retrieved on Jan. 23, 2018]; pp. 82-83.
(Continued)

*Primary Examiner* — Samina F Choudhry
(74) *Attorney, Agent, or Firm* — Harrington & Smith

(57) ABSTRACT

Embodiments herein provide a method for fast activation of multi-connectivity utilizing uplink signals. According to an example embodiment, a method includes: transmitting, by a user equipment, at least one uplink signal to a plurality of network nodes of a wireless network based at least on the user equipment being in a first radio resource control state such that the user equipment maintains connectivity with one of the network nodes; receiving at least one connection message including a command to connect to at least two of the network nodes for communication, wherein the command is based at least on measurements extracted from the at least one uplink signal; in response to the at least one connection message, changing from the first radio resource control state to a second radio resource control state; and transmitting data utilizing multiple communication links via the at least two network nodes.

14 Claims, 7 Drawing Sheets

(51) Int. Cl.
*H04W 76/25* (2018.01)
*H04W 36/30* (2009.01)
*H04W 74/08* (2009.01)
*H04W 36/00* (2009.01)
*H04B 7/06* (2006.01)
*H04W 36/38* (2009.01)
*H04W 36/04* (2009.01)
*H04W 88/06* (2009.01)

(52) U.S. Cl.
CPC .......... *H04W 76/15* (2018.02); *H04W 76/25* (2018.02); *H04B 7/0617* (2013.01); *H04W 36/0088* (2013.01); *H04W 36/04* (2013.01); *H04W 36/38* (2013.01); *H04W 88/06* (2013.01)

(58) Field of Classification Search
CPC . H04W 36/0088; H04W 36/04; H04W 36/38; H04B 7/0617
See application file for complete search history.

(56) References Cited

U.S. PATENT DOCUMENTS

| | | | | |
|---|---|---|---|---|
| 2011/0317637 | A1* | 12/2011 | Kim | H04L 1/1819 370/329 |
| 2013/0077550 | A1 | 3/2013 | Ptasinski | |
| 2013/0242735 | A1* | 9/2013 | Koc | H04W 72/0413 370/232 |
| 2014/0233459 | A1 | 8/2014 | Dahod et al. | |
| 2015/0244429 | A1* | 8/2015 | Zhang | H04B 7/024 370/329 |
| 2016/0135172 | A1* | 5/2016 | Sun | H04L 5/0007 370/329 |
| 2016/0212752 | A1 | 7/2016 | Xu et al. | |
| 2017/0331577 | A1* | 11/2017 | Parkvall | H04B 7/0452 |
| 2018/0027466 | A1* | 1/2018 | Trott | H04W 36/14 |

OTHER PUBLICATIONS

R2-167066, "NR uplink measurement based mobility in the inactive state", Qualcomm Incorporated, 3GPP TSG-RAN2#95bis, Oct. 2016, 5 pgs.
R3-161939, "NR RRC inactive state principles", Qualcomm Incorporated, 3GPP TSG-RAN WG3 Meeting #93, Aug. 2016, 4 pgs.
Da Silva, Icaro Leonardo, et al., "A Novel State Model for 5G Radio Access Networks", 2016 IEEE international Conference on Communications Workshops (ICC), IEEE May 23, 2016, pp. 632-637.
R2-163998, "Handling of inactive UEs", Ericsson, 3GPP TSG-RAN WG2 #94, May 2016, 6 pgs.
"$3^{rd}$ Generation Partnership Project; Technical Specification Group Services and System Aspects; Study on Architecture for Next Generation System (Release 14) Chapter 6.3.2.1 and Annex A", 3GPP TR 23.799 V1.0.2, Sep. 2016, 5 pgs.
S2-161276, "Solution Mobility Framework", Nokia Networks, SA WG2 Meeting #S2-113ah, Feb. 2016, 6 pgs.
Arnold, Paul, et al., "Mobile and wireless communications Enablers for the Twenty-twenty Information Society-II Deliverable D2.2 Draft Overall 5G RAN Design", https://metis-ii.5g-ppp.eu/wp-content/uploads/deliverables/METIS-II_D2.2.V1.0.pdf; Jun. 30, 2016 [retrieved on Aug. 18, 2017], Chapters 6.1.2, 6.2.1 and 6.3.2, 11 pgs.
Sally, Mikko, et al., "Mobile and wireless communications Enablers for the Twenty-twenty Information Society-II Delvierable D6.1 Draft Asynchronous Control Functions and Overall Control Plane Design", https://metis-ii.5g-ppp.eu/wp-content/uploads/deliverables/METIS-II_D6.1_V1.0.pdf; Jun. 30, 2016, [retrieved on Nov. 24, 2016], Chapters 5.3-5.3.3, 4 pgs.
R2-164893, "Considerations on mobility based on UL signals", Nokia, Alcatel-Lucent Shanghai Bell, 3GPP TSG-RAN WG2 Meeting #95, Aug. 22-26, 2016, 3 pgs.
R2-164791, "Discussion of RRC States and its configurability for NR", Nokia, Alcatel-Lucent Shanghai Bell, 3GPP TSG-RAN WG2 Meeting #95, Aug. 22-26, 2016, 6 pgs.
R2-165555, "Energy conserved operation evaluation", Huawei, HiSilicon, 3GPP TSG-RAN WG2 #95, Aug. 22-26, 2016, 9 pgs.
"Mobile and wireless communications Enablers for the Twenty-twenty Information Society-II/Deliverable D6.1 Draft Asynchronous Control Functions and Overall Control Plane Design, Version: v1.0", METIS II, Jun. 30, 2016, 120 pgs.

* cited by examiner

FAST ACTIVATION OF MULTI-CONNECTIVITY UTILIZING UPLINK SIGNALS

TECHNICAL FIELD

This invention relates generally to wireless networks and, more specifically, relates to radio resource control states for devices capable of multi-connectivity.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the main part of the detailed description section.

Typically, wireless networks include two broad radio resource control states: an idle state, and a connected state. The radio resource control state of a user device determines the functional capabilities and behaviors of the user device and the radio resource configuration for the user device.

BRIEF SUMMARY

This section is intended to include examples and is not intended to be limiting.

In an example embodiment, an apparatus comprises: at least one processor; and at least one non-transitory memory including computer program code, the at least one memory and the computer program code configured to, with the at least one processor, cause the apparatus at least to perform: transmit, by a user equipment, at least one uplink signal to a plurality of network nodes of a wireless network based at least on the user equipment being in a first radio resource control state such that the user equipment maintains connectivity with one of the network nodes; receive at least one connection message comprising a command to connect to at least two of the network nodes for communication, wherein the command is based at least on measurements extracted from the at least one uplink signal; in response to the at least one connection message, change from the first radio resource control state to a second radio resource control state; and transmit data utilizing multiple communication links via the at least two network nodes.

In another example embodiment, am apparatus comprises: at least one processor; and at least one non-transitory memory including computer program code, the at least one memory and the computer program code configured to, with the at least one processor, cause the apparatus at least to perform: receive, by a first network node connected to a plurality of further network nodes of a wireless network, measurement information for each of a plurality of user equipments, wherein the measurement information is based on uplink signals transmitted from each of the plurality of user equipments in a first radio resource control state; maintain, for each of the plurality of user equipments, a set of candidate links and cell-specific uplink timing advance values based on the measurement information; in response to initiation of a random access procedure by a given one of the user equipments, select at least two of the further network nodes to be used in a multi-connectivity session for communicating with the given user equipment; and cause at least one connection message to be transmitted to the given user equipment comprising a command to connect to the at least two selected network nodes.

In another example embodiment, a method comprises: transmitting, by a user equipment, at least one uplink signal to a plurality of network nodes of a wireless network based at least on the user equipment being in a first radio resource control state such that the user equipment maintains connectivity with one of the network nodes; receiving at least one connection message comprising a command to connect to at least two of the network nodes for communication, wherein the command is based at least on measurements extracted from the at least one uplink signal; in response to the at least one connection message, changing from the first radio resource control state to a second radio resource control state; and transmitting data utilizing multiple communication links via the at least two network nodes.

DETAILED DESCRIPTION

Figure 1:
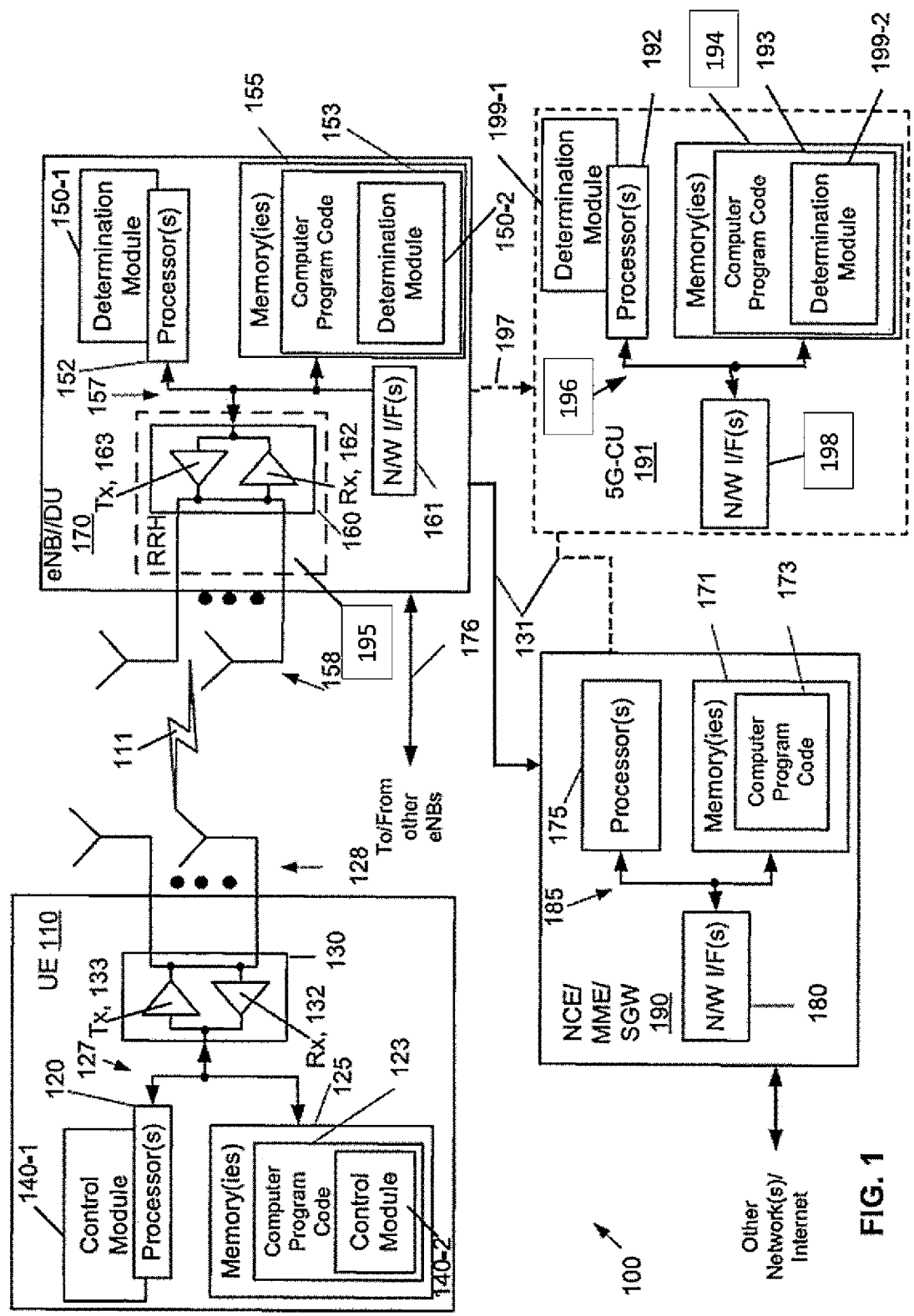
FIG. 1 is a block diagram of one possible and non-limiting exemplary system in which the exemplary embodiments may be practiced.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Although terms used herein may refer to terms typically used in LTE, these terms should not be seen as being limited to LTE. For example, the term 'eNB' is also applicable to a 5G NodeB. For the purposes of this description, the terms 'distributed unit' and 'centralized unit' may refer to a 'distributed radio node' and a 'centralized radio node', respectively.

The term 'uplink beacon' as used herein refers to any type of uplink signal from a user equipment which can be considered as a signal with point-to-point or point-to-multipoint characteristics and measurable by target receiving nodes.

The distributed network deployment scenario is typical to the LTE system architecture. In 5G, support for the centralized processing is expected with the upper protocol layer functions being placed in centralized units (CU), while distributed units (DU) operate the 5G radio interface.

The New Radio (NR, 5G) study item description FS_NR_newRAT was approved in 3GPP RAN #71 meeting. The operational state of the RRC protocol, e.g. RRC state, is one of the most important factors impacting the overall control plane design. In 3GPP, there seems to be an agreement to introduce a new RRC state where the devices are always connected to the core network, also during inactive times. This RRC state is referred to herein as the RRC_CONNECTED_INACTIVE (see e.g. RAN2 meeting #95, R2-164791, Source: Nokia).

The RRC_CONNECTED_INACTIVE state can denote a low activity state which can be for example a sub-state of RRC_CONNECTED. The low activity state may also be an energy saving state, for example, when the related service uses vehicle communications, machine type communication or the apparatus involved is an Internet of Things apparatus, such as a metering or surveillance device. In a low activity state, a user device may monitor a physical downlink control channel (PDCCH) continuously and/or discontinuously. The user device may also monitor a paging or a notification channel. The low activity state may be configurable. Accordingly, the term 'radio resource control state' as used herein refers to explicit RRC states (such as RRC_CONNECTED, for example) as well as sub-states of RRC states (such as the aforementioned low activity state, for example).

Multi-Connectivity is one of the new features of 5G. Multi-connectivity is seen as key enabler for services requiring ultra-reliable low latency communications (URLLC). A recent NR proposal proposes to introduce uplink mobility measurements performed by base stations. This is in contrast to LTE, where mobility measurements are performed by user equipments (UEs) and reported to the network. The challenges of uplink mobility measurements are discussed in R2-164893, *"Considerations on mobility based on UL signals"* (Source: Nokia).

The exemplary embodiments herein describe techniques for fast activation of multi-connectivity utilizing uplink signals. Additional description of these techniques is presented after a system into which the exemplary embodiments may be used is described.

Turning to FIG. 1, this figure shows a block diagram of one possible and non-limiting exemplary system in which the exemplary embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a control module, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with eNB 170 via a wireless link 111.

The eNB (evolved NodeB)/DU 170 is a base station (e.g., for LTE, long term evolution) that provides access by wireless devices such as the UE 110 to the wireless network 100. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The eNB 170 includes a determination module, comprising one of or both parts 150-1 and/or 150-2, which may be implemented in a number of ways. The determination module may be implemented in hardware as determination module 150-1, such as being implemented as part of the one or more processors 152. The determination module 150-1 may be implemented also as an integrated circuit or through other hardware such as a programmable gate array. In another example, the determination module may be implemented as determination module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs 170 may communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

It is noted that description herein indicates that "cells" perform functions, but it should be clear that the eNB that forms the cell will perform the functions. The cell makes up part of an eNB. That is, there can be multiple cells per eNB. For instance, there could be three cells for a single eNB carrier frequency and associated bandwidth, each cell covering one-third of a 360 degree area so that the single eNB's coverage area covers an approximate oval or circle. Furthermore, each cell can correspond to a single carrier and an eNB may use multiple carriers. So if there are three 120 degree cells per carrier and two carriers, then the eNB has a total of 6 cells.

FIG. 1, also is also representative of a centralized network deployment scenario. For this scenario, the 5G-CU 191 is also included as part of the wireless network 100. The 5G-CU 191 includes one or more processors 192, one or more memories 194, and one or more network interfaces (N/W I/F(s)) 198 interconnected through one or more buses 196. The one or more memories 194 include computer program code 193. The 5G-CU 191 includes a determination module, comprising one of or both parts 199-1 and/or 199-2, which may be implemented in a number of ways. The determination module may be implemented in hardware as determination module 199-1, such as being implemented as part of the one or more processors 192. The determination module 199-1 may be implemented also as an integrated circuit or through other hardware such as a programmable gate array. In another example, the determination module may be implemented as determination module 199-2, which is implemented as computer program code 193 and is executed by the one or more processors 192. For instance, the one or more memories 194 and the computer program code 193 are configured to, with the one or more processors 192, cause the 5G-CU 191 to perform one or more of the operations as described herein. The one or more network interfaces 198 communicate over a network such as via the links 197 and 131. Although not shown, one or more 5G-CUs 191 may communicate using, e.g., a wired or wireless or both and may implement, e.g., a similar interface such as the X2 interface.

For the centralized network deployment scenario, the eNB/DU 170 may be a distributed unit (DU), and the DU 170 may communicate with a 5G-CU 191 via link 197, such as an Ethernet link, for example, and in turn the 5G-CU 191 may communicate with the NCE 190 via link 131, such as via a fiber optic link.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). At least one of the eNB/DU 170 and the 5G-CU 191 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, 194, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, 194, and 171 may be means for performing storage functions. The processors 120, 152, 192, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, 192, and 175 may be means for performing functions, such as controlling the UE 110, eNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Figure 2:
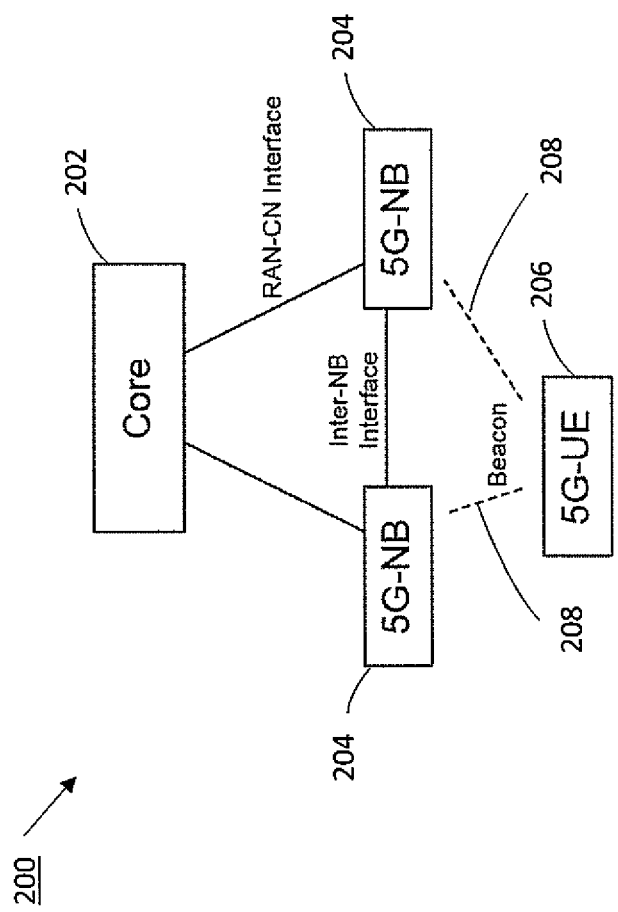
FIG. 2 is a simplified block diagram of an example distributed wireless architecture in accordance with exemplary embodiments.
Figure 3:
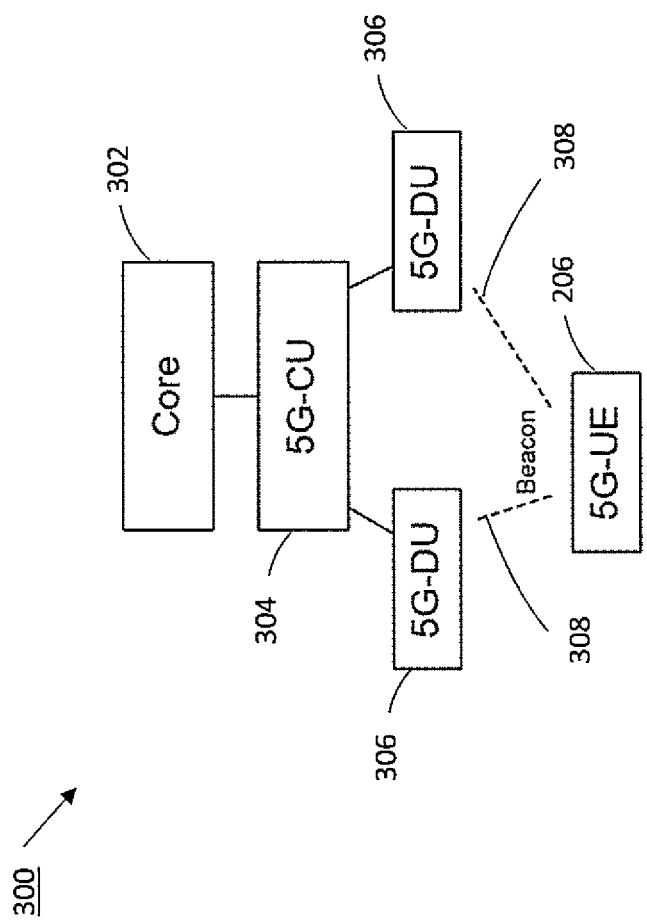
FIG. 3 is a simplified block diagram of an example centralized wireless architecture in accordance with exemplary embodiments.

Embodiments described herein are applicable to both a distributed architecture (such as shown in FIG. 2, for example) and a centralized architecture (such as shown in FIG. 3, for example). Referring now to FIG. 2, this figure shows a simplified non-limiting example of a distributed deployment architecture 200 in accordance with exemplary embodiments. In this example, the distributed deployment architecture 200, shows a core network 202, two 5G-NBs 204 and a 5G-UE 206. The 5G NBs 204 may communicate by the help of Shared Data Layer (SDL) or horizontal interface (such as link 176 in FIG. 1, for example). The 5G-UE 206 and 5G-NB may be implemented as UE 110 and eNB 170 from FIG. 1, respectively. In addition, the core network 202 may include, for example, NCE 190. In this example, the 5G-UE sends an uplink signal, which in this example is shown as uplink beacon 208, to one or more of the 5G-NBs 204 in accordance with exemplary embodiments described below.

Referring now to FIG. 3, this figure shows a simplified example of a centralized deployment architecture 300. The centralized deployment architecture 300, shows a core network 302, a 5G centralized unit (CU) 304, two 5G distributed units (DUs) 306, and a 5G-UE 206. In FIG. 3, the 5G-UE 206 transmits an uplink signal, which in this example is shown as uplink beacon 308, to the DUs 306. The CU 304 may correspond to 5G-CU 191, for example; and DU 306 may correspond to eNB/DU 170, for example. In the example centralized deployment architecture 300, centralized processing may be performed with the upper protocol layer functions being placed in CUs 304 (e.g. the upper layers of the protocol stack), while the DUs 306 operate the lower layers of the 5G radio interface. In some examples, the radio resources from multiple DUs 306 connecting to the same CU 304 can be aggregated. The protocol stack can be split between CU 304 and DU 306 in low (e.g. PHY) or high (e.g. RLC or PDCP) protocol layer. In this way, two types of centralized architectures may be considered, as described in more detail below.

In a first type of centralized architecture, a CU (e.g. CU 304) includes non-real time protocols (such as Radio Resource Control (RRC), Packet Data Convergence Protocol (PDCP), and possibly part of Radio Link Control (RLC)), and a DU (e.g. DU 306) includes all of the lower protocols. A DU also possibly hosts one or many remote RF units (e.g. RF transceivers). The DU and CU are connected with a non-ideal (e.g. Ethernet) transport, and a DU and RRH are connected with an ideal (e.g. fiber) transport. A CU terminates the core network (CN) control-plane and user-plane interfaces, and may also be connected by a horizontal interface to other DUs, similar to the LTE X2 interface for example. Together a CU, underlying DUs, and RRHs form a logical eNB (or, in 5G terms, a gNB). This type of centralized architecture is not currently supported by the LTE specification; however, proprietary realizations for LTE exist, such as NOKIA's Cloud D-RAN architecture, for example).

In a second type of centralized architecture, the CU contains non-real time and real-time protocols, possibly down to the physical layer (L1). The exact split is still being discussed in 3GPP. A CU may host multiple RRHs, connected by an ideal transport. Similar to the first type of centralized architecture, a CU terminates CN control-pane and user-plane interface and may be connected to other CUs by a horizontal interface. Together, a CU and RRHs form logical eNB. One consequence of this second type of architecture is that the distributed nodes (e.g. RRHs) have a common MAC layer, hence enabling tighter coordination techniques such as CoMP and CA. Currently, this type of architecture is already supported by LTE specification.

The first type of architecture relates to multi-connectivity like coordination, whereas the second type relates to CoMP or carrier aggregation like coordination. For the purposes of this description, the exemplary embodiments relate to the first type of centralized architecture, as they address, for example, the fast activation of multi-connectivity. It is further noted that the decisions for fast activation of CoMP or CA legs occur at the L1/MAC layers, and therefore present different problems than fast activation of multi-connectivity legs which occur at the RRC layer.

Having thus introduced suitable but non-limiting technical contexts for the practice of the exemplary embodiments of this invention, the exemplary embodiments will now be described with greater specificity.

As mentioned in background above, multi-connectivity is one of the new features of future wireless networks, such as 5G wireless networks. These future wireless networks allow increases in capacity, utilizing millimeter wave (mmWave) frequencies, for example. Communication links in mmWave networks are highly susceptible to blocking and therefore may have rapid variations in quality. Multi-connectivity allows a user equipment to connect to multiple cells such as mmWave and lower frequencies (e.g. frequencies utilized in LTE) in order to create a more robust connection and to enable services requiring ultra-reliable low latency communications (URLLC).

However, with the introduction of multi-connectivity, there is a mobility challenge during the inactive periods when the multi-connectivity capable moving devices (for example the devices with URLLC services) have inactive periods and the RRC state is configured to be in the low activity state, e.g. RRC Connected Inactive state. When the device needs to re-establish the active connectivity, the state transition from inactive state to active state while enabling the multi-connectivity is challenging. The reason this is challenging is that multi-connectivity consists of multiple radio legs which are allocated from, for example, different base stations. Thereafter, the resumption of the connectivity needs to assume downlink measurements of candidate cells over multiple radio legs and potentially new target cells need to be prepared with an up-to-date UE context and timing advance. The base station acting as the last serving cell for the UE needs to forward the uplink mobility measurement results to neighboring candidate cells in order to enable activation of multi-connectivity in those cells using the most efficient radio resources.

When UE moves from cell to cell, it needs to perform measurements to request activation of Dual Connectivity using the trigger event A6 for reporting the SCell/SeNB specific measurements (as described in 3GPP TS 36.331). As an example, in LTE network, the UE measures two parameters on reference signal: RSRP (Reference Signal Received Power) and RSRQ (Reference Signal Received Quality). Measurements are made in downlink from the serving cell and the neighboring cells and are processed in the UE. Processing is done to filter out the effect of fast-fading and Layer 1 (L1) measurement/estimation errors using a Layer 3 (L3) filter. After the trigger event, the processed measurements are reported back to the serving base station in a periodic or event based manner in uplink using radio resource control (RRC) signaling. To improve the measurement accuracy a longer L3 filtering period can be used. L3 filtering values are a compromise between user velocity and reporting accuracy. Values between 300 ms to 3000 ms may be used, where the slowly moving users require longer filtering period due to correlated shadow fading. This adds significant delay to the activation of multi-connectivity. Shorter values of L3 filter will trigger unnecessary additions of secondary links increasing probability of secondary link radio link failure, which is also problematic for URLLC.

For single connectivity a fast resumption of the connectivity can be achieved using, for example, the standardized methodology of Narrow-band IoT for LTE in Rel-13, where the network can suspend the connection and store the UE Context in RAN. The resumption procedure can be combined with Secondary eNB change standardized in LTE Dual-Connectivity to achieve resumption procedure multi-connectivity. It is assumed that this way the resumption of multi-connectivity is faster compared to full RRC_IDLE to RRC_CONNECTED state transition including activation of multi-connectivity. Although the approach may work, the problem in this approach is that the resumption of multi-connectivity is not efficient enough for URLLC applications due to significant signaling overhead and associated delay.

Figure 4:
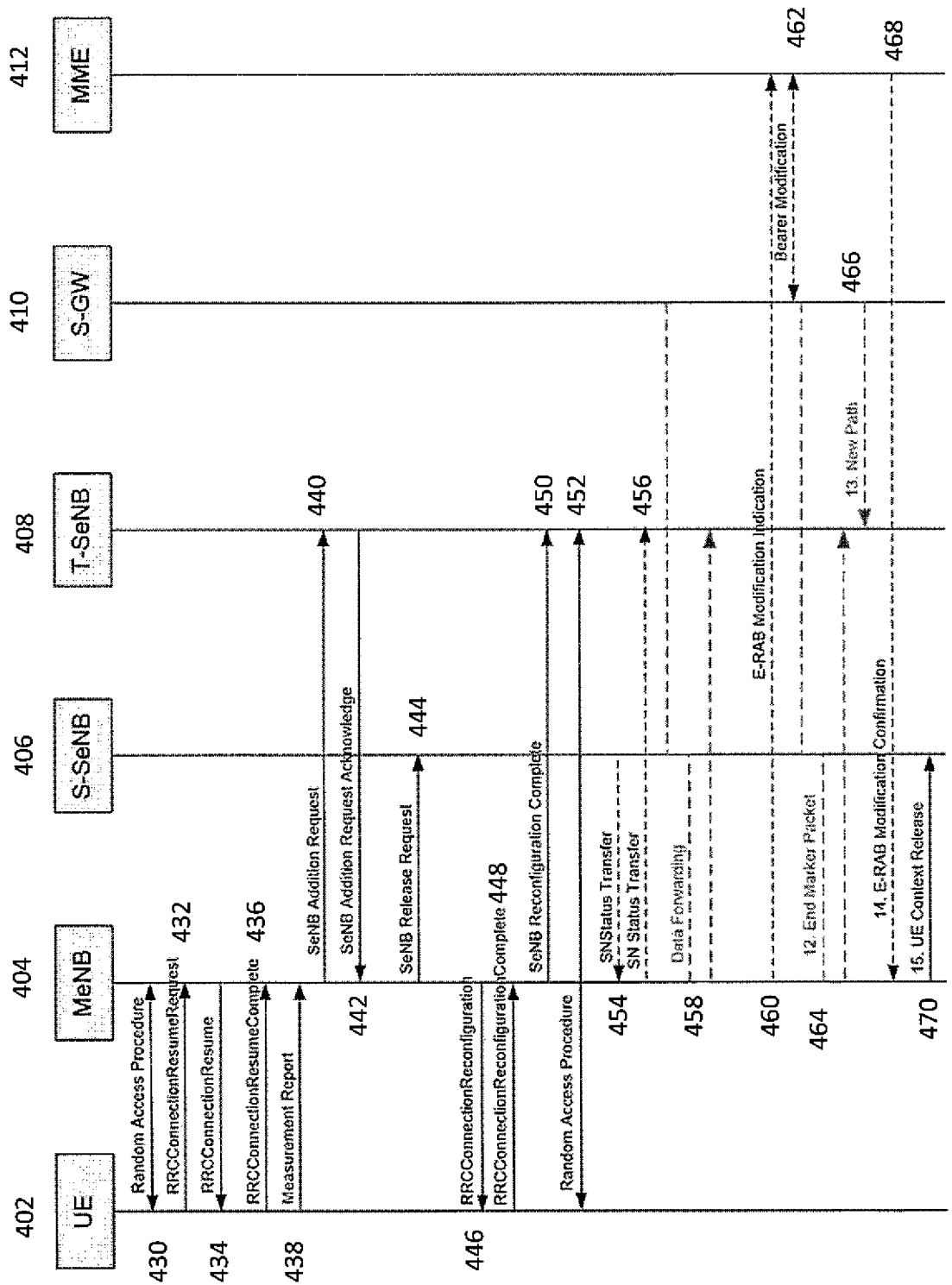
FIG. 4 is a signaling diagram illustrating signaling showing a change of a secondary eNB after resuming Dual/Multi-connectivity.

Referring now to FIG. 4, this figure illustrates a modified procedure to activate multi-connectivity after connection resumption in accordance with 3GPP TS 36.331. This figure shows the significant signaling overhead required to re-activate the multi-connectivity in the new target base station 408 when UE 402 has been suspended with multi-connectivity and the S-SeNB 406 has changed. The signaling in the modified procedure shown in FIG. 4 can be summarized as follows:

430: UE 402 performs a random access procedure with a MeNB 404;
432: UE 402 sends RRCConnectionResumeRequest to the MeNB 404;
434: MeNB 404 sends a RRCConnectionResume to UE 402 in response to the RRCConnectionRequestResume message;
436: UE 402 sends RRCConnectionComplete message to the MeNB 404;
438: UE 402 sends Measurement Report to MeNB 404;
440: MeNB 404 sends a SeNB Addition Request to the T-SeNB 408;
442: In response to 440, T-SeNB 408 sends an Addition Request Acknowledge message to the MeNB 404;

444: MeNB 404 sends a SeNB Release Request to the S-SeNB 406;

446: MeNB 404 sends a RRCConnectionReconfiguration message to UE 402;

448: UE 402 sends a RRCConnectionReconfiguration-Complete message to MeNB 404;

450: MeNB 404 sends a SeNB Reconfiguration Complete message to T-SeNB 408;

452: UE 402 performs a random access procedure with T-SeNB 408;

454: S-SeNB 406 sends a SN Status Transfer message to MeNB 404;

456: MeNB 404 sends a SN Status Transfer message to T-SeNB 408;

458: If necessary, data is forwarded to the T-SeNB 408 via the serving gateway (S-GW) 410;

460: E-RAB modification Indication is sent from the MeNB 404 to the MME 412;

462: Bearer modification is performed between the MME 412 and the S-GW 410;

464: An End Marker packet is sent by the S-GW 410 to the S-SeNB 406 to indicate the end of the data stream, which in turn is forwarded to the T-SeNB 408;

466: A S-GW 410 indicates a new path to the T-SeNB 408;

468: MME 412 sends an E-RAB Modification Confirmation to the MeNB 404; and 470: MeNB 404 sends a UE Context Release message to the S-SeNB 406.

It is noted that the measurement configuration is not shown in FIG. 4.

The following delay components can be identified from the modified LTE procedure shown in FIG. 4:

RRC Connection Resume including Random Access to PCell and measurement configuration: Single connectivity can be resumed in a fast manner (<10 ms) in LTE by the means of RRC connection resume procedure.

Averaging of PSCell measurements, reporting to network: The PSCell measurements are expected to be the most significant contributor to the activation latency. In LTE, it takes typically 600-800 ms for the UE to produce a stable measurement result, depending on parameters such a TTT, DRX, and L2 filtering. Similar figures are expected for 5G.

SeNB addition: The SeNB addition delay is expected to be something in between few milliseconds to a couple of tens of milliseconds depending on the X2 delay and hardware processing times.

RRC connection reconfiguration (SCell addition): The RRC connection reconfiguration is expected to consume less than 10 ms.

Random access to PSCell: The random access to PSCell is expected to consume less than 10 ms, depending on RACH design.

Possible data forwarding and path update.

To summarize the delay component above, it may take up to 1 second to resume a multi-connectivity session following the procedures of LTE, the main delay component being UE measurements. Consequently, multi-connectivity cannot be utilized to serve occasional bursts of data with high data rate which leads to inefficient utilization of the UE power resources. Furthermore, the network may not be able to suspend RRC connection in a dynamic manner (e.g. in the time scale of hundreds of milliseconds compared to 5-30 s of LTE) as the multi-connectivity cannot keep up with the state transition dynamics. Consequently, the UE will spend more time in the RRC_CONNECTED state, resulting in worse energy efficiency and increased signaling load.

Exemplary embodiments described herein, utilize uplink signals (such as an uplink beacon signal, for example) in a centralized architecture for fast resume of multi-connectivity from a RRC_CONNECTED_INACTIVE state, for example. According to exemplary embodiments, fast resume can be accomplished in the following manner:

While in RRC_CONNECTED_INACTIVE state, a UE camps to the best cell, based on downlink measurements and network configured cell re-selection parameters. It is assumed that the UE is downlink synchronized to each detected neighbor cell.

UE is configured to transmit uplink beacon signals in RRC_CONNECTED_INACTIVE state. These beacons are orthogonal among different UEs and may be transmitted with cell-specific uplink timing shift to enable the estimation of uplink timing advance in network side;

The beacon signals are received by Distributed Units (e.g. DUs 306 from FIG. 3), each DU being connected to a Central Unit (e.g. CU 304);

Two types of measurements are extracted in DUs and then passed to a CU: link quality measurements; and estimates for the uplink timing advance;

The CU maintains a set of candidate links per UE, representing the preferred choices for a multi-connectivity session. In addition, CU maintains cell-specific uplink timing advance values per UE;

Upon arrival of uplink data, UE initiates a random access towards the cell that is camped to and sends RRCConnectionResumeRequest message to the wireless network as part of the initial uplink message;

Upon arrival of uplink or downlink data, network sends RRCConnectionResume message to UE, including a command to resume multi-connectivity to indicated cells. This message comprises cell-specific timing advance value(s) to be applied for subsequent UL transmissions; and After above steps, the UE is ready to receive and transmit data utilizing multiple communication links.

Uplink Beacon Signal Design

The following non-limiting example implementations of the uplink beacon signal design demonstrate feasible implementations of exemplary embodiments described herein.

The UL beacons may be based on a sequence (preamble) design similar to random access preamble of LTE. Such design allows the following information to be extracted at the DU receiver:

Power Delay Profile (PDP) estimation: can be used to estimate UE's transmission timing.

Signature Detection: can be used to identify the received signature (cyclic shift) out of N available signatures, where N is subject to preamble design (N=64 for LTE RACH).

Channel quality estimation: can be used to estimate the SINR of the frequency chunk covered by the preamble.

The beacons from different UEs can be received in a DU based on contention-free (CF) or contention-based (CB) design. In CF approach, each UE is assigned a dedicated beacon signature as part of the RRC connection suspend message. In CB approach, a number of UEs are assigned with the same (or random) signature, hence resulting to collisions.

The collisions can be effectively reduced in a centralized architecture by a mix of CF and CB approach, e.g. avoiding reuse of a same signature in neighboring cells and assigning different time/frequency resources for a signature to be reused within one cell. The residual collisions (e.g. occasional receptions of the same sequence from two UEs despite of the previously mentioned measures) are detected in a DU, and handled by the CU by assigning different signatures to colliding UEs.

The number of signatures per cell is assumed to be considerably lower compared to the number of UEs. This is partly because beacons are transmitted only by the UEs needing multi-connectivity (mainly eMBB slice), and partly because the beacons might be transmitted for a limited period of time after suspending a multi-connectivity session. The number of signatures can be further reduced by configuring a UE to transmit beacons only if the measured DL quality of at least N cells satisfies a quality criterion and/or the cell advertises multi-connectivity as part of the system information broadcast. In any case, the beacon signature space should be designed according to expected demand.

Beacon Synchronization and Estimation of the Timing Advance

It is assumed that CUs participating in beacon reception are time synchronized to a level similar to TDD operation and eICIC (e.g. around 1-10 µs in LTE). Furthermore, the UE is expected to be synchronized to the downlink of each cell detected for neighboring cell measurements. Based on these assumptions, the synchronization of uplink beacons may be performed according to the following:
1. All uplink beacons are synchronized relative to one reference, e.g. the serving cell. The CU can then estimate the timing advance (TA) based on a reference cell and apply that value to all cells in the multi-connectivity setup. This approach might be feasible in deployments with relatively small cell size.
2. Each uplink beacon is synchronized relative to a certain target cell, where the target cell is changed from one beacon transmission to another to get a complete set of cell-specific TA estimates after one full cycle. To facilitate this, the UE is configured with the time/frequency resources for each preamble signature.

A further variation of option 2, is to estimate the TA only per layer (e.g. per macro and small cell layer) exploiting the fact that a single TA might be applicable to a group of cells (e.g. all neighboring small cells). Another possibility is to transmit the beacons for TA estimation with a longer cycle than the beacons for link quality estimation.

Beacon Configuration

In general, beacon transmission may be one aspect of the configurable CONNECTED_INACTIVE state. The following aspects may be configured by the network, allowing flexible utilization of the feature:
1. The beacons may be configured to be transmitted on an as needed basis. For example, the beacons may be transmitted only during a limited period after suspending a multi-connectivity session, exploiting the higher likelihood of subsequent data communication (especially considering much lower inactivity timer setting for 5G compared to LTE). Furthermore the beacon transmission may be activated in a pre-emptive manner based on some higher layer knowledge about future data communication (QoS) requirements.
2. Periodicity of the beacon transmissions may be configured based on various criteria, such as mobility state (shorter period for fast mobiles) and radio link type (shorter period for mm-wave).
3. Beacon transmission may be limited by some triggering condition. For example, the UE might transmit beacons only for cells which satisfy a criterion for received signal strength. In extreme case (only one cell satisfying the criterion) no beacons need to be transmitted. Such approach would efficiently reduce unnecessary beacon transmissions in multi-layer deployments with sparse small cell layer.
4. A UE might limit beacon transmissions to cells that advertise multi-connectivity.
5. The beacon bandwidth may be configured according to target use. A narrowband signal might be appropriate for localized paging and TA estimation, while larger bandwidth (or alternatively a longer measurement time) would be required for link quality measurements. The beacon periodicities of these two use cases (bandwidths) might be different to optimize resource utilization.
6. The beacon power may be decided by the UE based on rules configured by the network. As a baseline, the power may be set based on downlink measurements plus an offset configured by the network. In the case of same beacon being received by multiple cells, the transmission power would need to be selected according to the worst cell.

Applicability to High Frequencies

The embodiments described herein can be adapted to high frequency (beamformed) cells by following one of the following paradigms:

The beacons are beamformed in both UE and network sides. This setup provides maximum coverage (the same as for the U-plane) for the beacon reception, however sacrificing the spectrum efficiency due to beam sweeping in both UE and network ends. It is however quite unlikely that such extensive coverage would be needed as there is not much point for selecting a very weak link for multi-connectivity.

The beacons are (RX-) beamformed only in network side, hence reducing the sweeping time and complexity, but with a slight impact on coverage.

Beamforming is not utilized for beacon transmission and reception. This approach significantly reduces the beacon coverage due to absence of high gain from RX beamforming. It may still be a valid approach for cases with high threshold for secondary link.

Applicability to 5G-LTE Interworking

The beacon based activation is expected to be directly applicable to scenario where the UE is camped to LTE cell (DU) and requires a fast activation of LTE-5G multi-connectivity. The opposite might not be possible, assuming that the LTE cell (DU) does not support beacon reception.

Applicability to Network Slicing

The beacon based activation may be exploited in the context of network slicing. In particular, the UE may be configured to transmit beacons in CONNECTED_INACTIVE state according to the slices supported by the network and UE. As an example, an UE supporting eMBB and URLLC slices may be configured by the network to camp on the macro layer (to save battery and reduce signaling), however transmitting beacons to URLLC and eMBB layers (cells dedicated to those use cases) to allow fast activation of multi-connectivity.

Applicability to Distributed Deployments

The exemplary embodiments may be applicable to distributed architectures (where radio nodes are connected by horizontal interface, such as shown in FIG. 2 for example) by the help of Shared Data Layer (SDL) or horizontal interface (X2). In this setup the distributed nodes (5G-NB) are connected to SDL entity/layer or another 5G-NB, allowing one 5G-NB to expose the UL measurements to other 5G-NBs. By exposing the UL measurements, each 5G-NB can monitor the link quality and timing advances in a similar manner as in the CU/DU architecture described above. Besides distributed deployments, the embodiments enable fast activation of multi-connectivity in cloud borders, e.g., when the UE moves from a cell covered by one CU to a cell that is covered by another CU.

The distributed deployment scenario is similar to the LTE system architecture, where each 5G-NB hosts the full protocol and inter-5G-NB signaling is needed to exchange mobility related information between nodes. In 3GPP RAN2 meeting #94, it has been agreed to study the upper layer aggregation (e.g. DC-like) for standalone 5G deployments. Therefore, 5G should also support centralization of the upper layers of the radio protocol stack. In this scenario, the UE is aware of the radio resources from multiple DUs connecting to same/different CUs and the incoming beacon from UE to multiple DUs is available in the CU(s).

Figure 5:
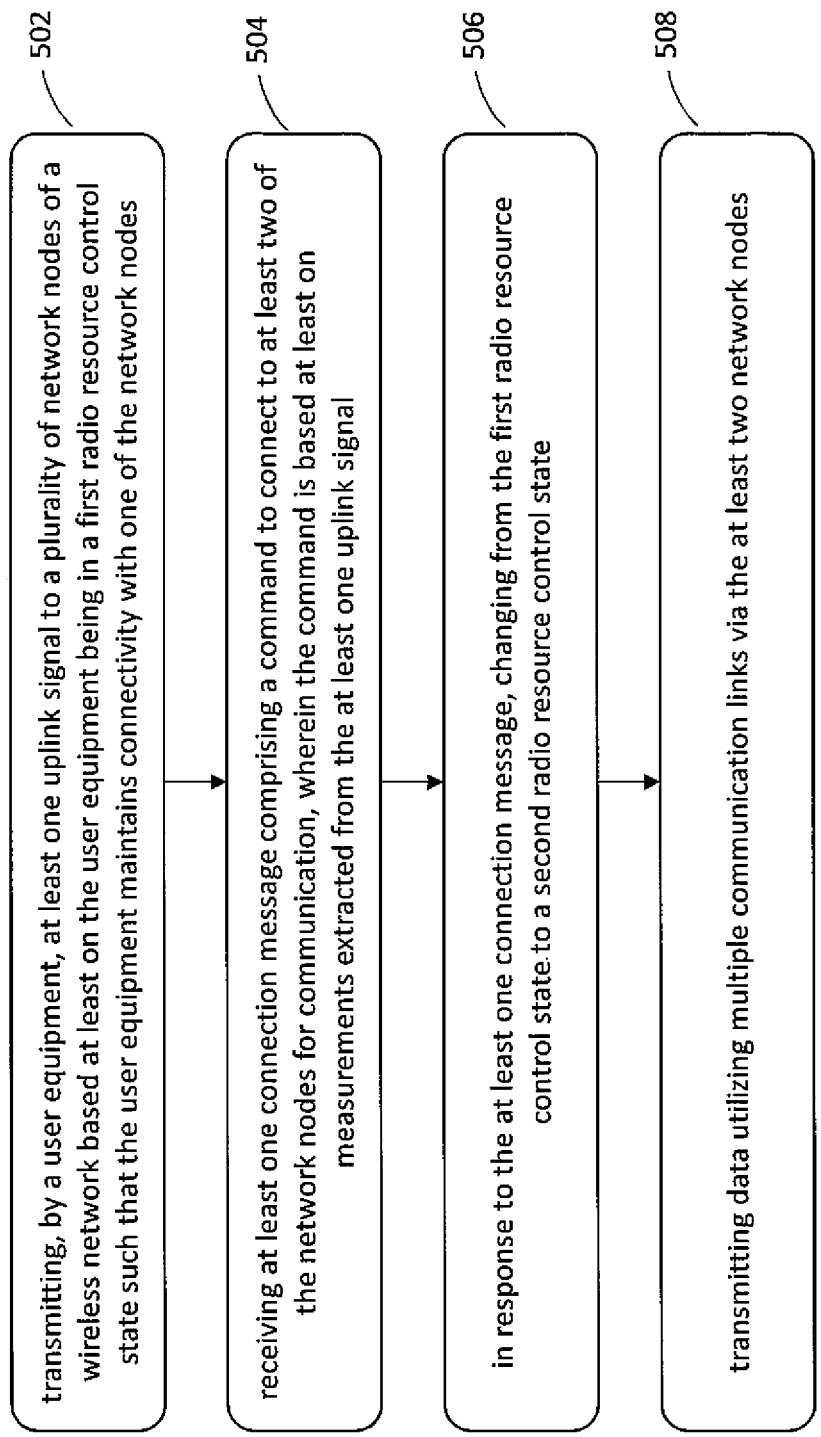
FIGS. 5-7 are logic flow diagrams for fast activation of multi-connectivity utilizing uplink signals, and illustrate the operation of an exemplary method, a result of execution of computer program instructions embodied on a computer readable memory, functions performed by logic implemented in hardware, and/or interconnected means for performing functions in accordance with exemplary embodiments.

FIG. 5 is a logic flow diagram for fast activation of multi-connectivity utilizing uplink signals. This figure further illustrates the operation of an exemplary method, a result of execution of computer program instructions embodied on a computer readable memory, functions performed by logic implemented in hardware, and/or interconnected means for performing functions in accordance with exemplary embodiments. For instance, the control module 140-1 and/or 140-2 may include multiples ones of the blocks in FIG. 5, where each included block is an interconnected means for performing the function in the block. The blocks in FIG. 5 are assumed to be performed by the UE 110, e.g., under control of the control module 140-1 and/or 140-2 at least in part.

Referring to FIG. 5, an example method may comprise: transmitting, by a user equipment, at least one uplink signal to a plurality of network nodes of a wireless network based at least on the user equipment being in a first radio resource control state such that the user equipment maintains connectivity with one of the network nodes as indicated by block 502; receiving at least one connection message comprising a command to connect to at least two of the network nodes for communication, wherein the command is based at least on measurements extracted from the at least one uplink signal as indicated by block 504; in response to the at least one connection message, changing from the first radio resource control state to a second radio resource control state as indicated by block 506; and transmitting data utilizing multiple communication links via the at least two network nodes as indicated by block 508.

The first radio resource control state may be at least one of: an inactive state and a low activity state, and wherein the user equipment may maintain connectivity based on cell-reselection parameters configured by the wireless network and downlink measurements. The first radio resource control state may be a RRC_CONNECTED_INACTIVE state; and the second radio resource control state is a RRC_CONNECTED state. The method may further include initiating a random access procedure at least by transmitting a request message towards the network node that the user equipment maintains connectivity with. Initiating the random access procedure may be performed in response to the user equipment determining a need to transmit uplink data to the wireless network, and wherein an initial uplink message of the random access procedure may comprise the request message. The user equipment may be downlink synchronized with each of the plurality of network nodes while the user equipment is in the first radio resource control state. The at least one uplink signal may include a cell-specific timing shift. The at least one connection message may include cell-specific uplink timing advance values for each of the at least two network nodes. Receiving the at least one connection message may include receiving a first connection message from a first network node comprising a command to connect to the first network node, and receiving a second connection message from a second network node comprising a command to connect to the second network node. Each of the one or more network nodes may be connected to a centralized network node, and wherein radio resource control protocol (RRC) and packet data convergence protocol (PDCP) may be located at the centralized network node comprises, and at least the medium access layer (MAC) protocol and physical layer (PHY) protocol may be located at the plurality of network nodes. The at least one uplink signal may comprise an uplink beacon signal.

In another embodiment, an apparatus may comprise: at least one processor; and at least one non-transitory memory including computer program code, the at least one memory and the computer program code configured to, with the at least one processor, cause the apparatus at least to perform: transmit, by a user equipment, at least one uplink signal to a plurality of network nodes of a wireless network based at least on the user equipment being in a first radio resource control state such that the user equipment maintains connectivity with one of the network nodes; receive at least one connection message comprising a command to connect to at least two of the network nodes for communication, wherein the command is based at least on measurements extracted from the at least one uplink signal; in response to the at least one connection message, change from the first radio resource control state to a second radio resource control state; and transmit data utilizing multiple communication links via the at least two network nodes.

The first radio resource control state is at least one of: an inactive state and a low activity state, and wherein the user equipment maintains connectivity based on cell-reselection parameters configured by the wireless network and downlink measurements. The first radio resource control state is a RRC_CONNECTED_INACTIVE state; and the second radio resource control state is a RRC_CONNECTED state. The at least one memory and the computer program code may be configured to, with the at least one processor, cause the apparatus at least to perform: initiate a random access procedure at least by transmitting a request message towards the network node that the user equipment maintains connectivity with. Initiation of the random access procedure may be performed in response to determination of a need to transmit uplink data to the wireless network, and wherein an initial uplink message of the random access procedure may comprise the request message. The user equipment may be downlink synchronized with each of the plurality of network nodes while the user equipment is in the first radio resource control state. The at least one uplink signal may comprise a cell-specific timing shift. The at least one connection message may comprise cell-specific uplink timing advance values for each of the at least two network nodes. Receiving the at least one connection message may include receiving a first connection message from a first network node comprising a command to connect to the first network node, and receiving a second connection message from a second network node comprising a command to connect to the second network node. Each of the plurality of network nodes may be connected to a centralized network node, and wherein radio resource control protocol (RRC) and packet data convergence protocol (PDCP) may be located at the centralized network node comprises, and at least the medium access layer (MAC) protocol and physical layer (PHY) protocol may be located at the plurality of network nodes. The at least one uplink signal comprises an uplink beacon signal.

An example embodiment may be provided in a non-transitory program storage device, such as memory 125 shown in FIG. 1 for example, readable by a machine, tangibly embodying a program of instructions executable by the machine for performing operations. The operations may include: transmitting, by a user equipment, at least one uplink signal to a plurality of network nodes of a wireless network based at least on the user equipment being in a first radio resource control state such that the user equipment maintains connectivity with one of the network nodes; receiving at least one connection message comprising a command to connect to at least two of the network nodes for communication, wherein the command is based at least on measurements extracted from the at least one uplink signal; in response to the at least one connection message, changing from the first radio resource control state to a second radio resource control state; and transmitting data utilizing multiple communication links via the at least two network nodes.

In another embodiment, an apparatus may comprise: means for transmitting, by a user equipment, at least one uplink signal to a plurality of network nodes of a wireless network based at least on the user equipment being in a first radio resource control state such that the user equipment maintains connectivity with one of the network nodes; means for receiving at least one connection message comprising a command to connect to at least two of the network nodes for communication, wherein the command is based at least on measurements extracted from the at least one uplink signal; in response to the at least one connection message, means for changing from the first radio resource control state to a second radio resource control state; and means for transmitting data utilizing multiple communication links via the at least two network nodes.

Figure 6:
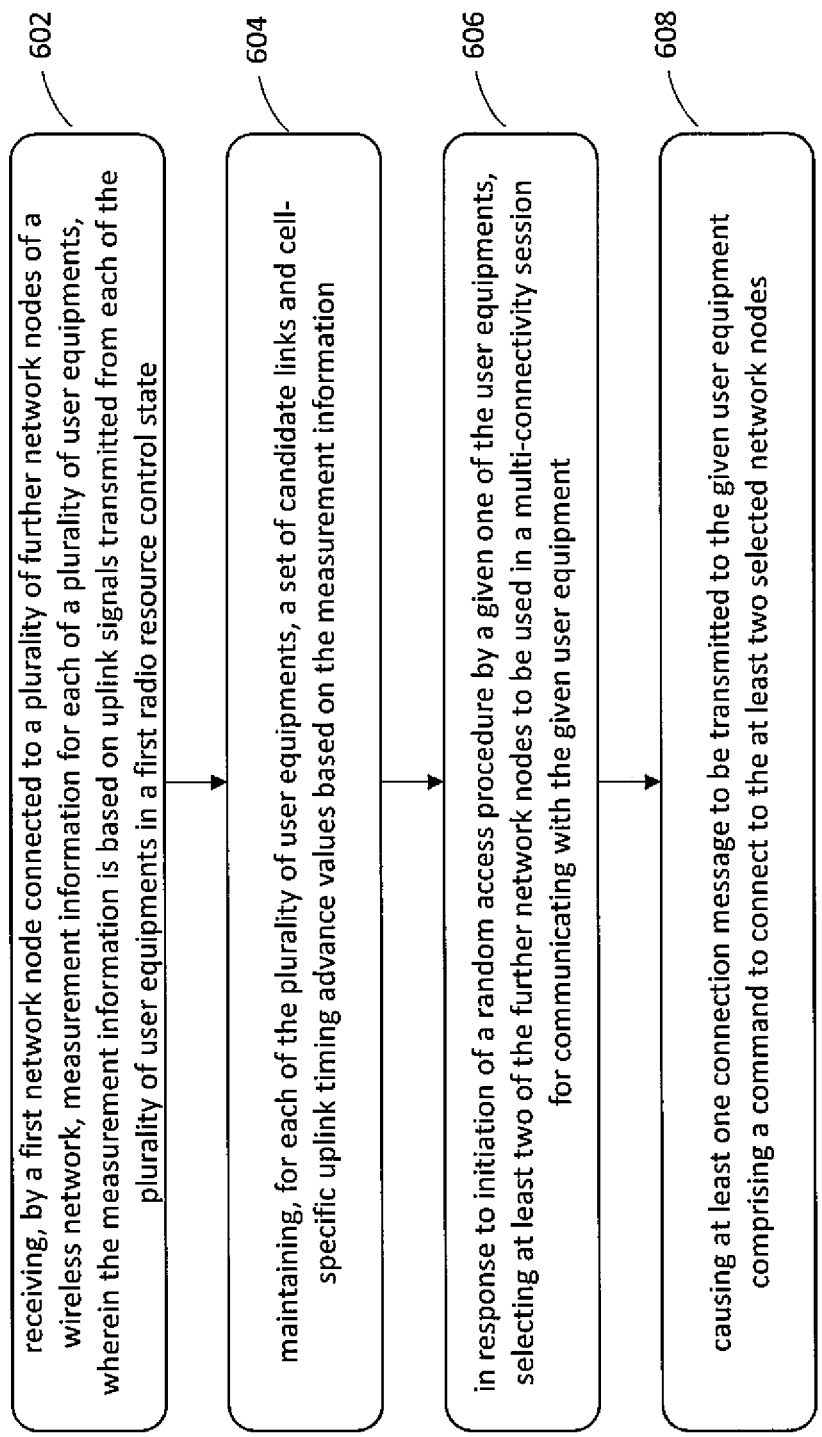

FIG. 6 is a logic flow diagram for fast activation of multi-connectivity utilizing uplink signals. This figure further illustrates the operation of an exemplary method, a result of execution of computer program instructions embodied on a computer readable memory, functions performed by logic implemented in hardware, and/or interconnected means for performing functions in accordance with exemplary embodiments. For instance, the determination module 199-1 and/or 199-2 may include multiples ones of the blocks in FIG. 6, where each included block is an interconnected means for performing the function in the block. The blocks in FIG. 6 are assumed to be performed by a centralized unit (e.g. 5G-CU 191), e.g., under control of the determination module 199-1 and/or 199-2 at least in part.

Referring to FIG. 6, an example method may comprise: receiving, by a first network node connected to a plurality of further network nodes of a wireless network, measurement information for each of a plurality of user equipments, wherein the measurement information is based on uplink signals transmitted from each of the plurality of user equipments in a first radio resource control state as indicated by block 602; maintaining, for each of the plurality of user equipments, a set of candidate links and cell-specific uplink timing advance values based on the measurement information as indicated by block 604; in response to initiation of a random access procedure by a given one of the user equipments, selecting at least two of the further network nodes to be used in a multi-connectivity session for communicating with the given user equipment as indicated by block 606; and causing at least one connection message to be transmitted to the given user equipment comprising a command to connect to the at least two selected network nodes as indicated by block 608.

The measurement information may include at least one of: a link quality measurement and an estimate for uplink advance timing. The connection message may include cell-specific uplink timing advance values for each of the selected at least two network nodes. Each of the uplink signals may comprises a cell-specific timing shift. The first radio resource control state may be at least one of an inactive state and a low activity state such that a user equipment maintains connectivity with one of the plurality of further network nodes based on cell-reselection parameters configured by the wireless network and downlink measurements. The radio resource control protocol (RRC) and packet data convergence protocol (PDCP) may be located at the first network node comprises, and at least the medium access layer (MAC) protocol and physical layer (PHY) protocol may be located at the plurality of further network nodes. The at least one connection message may include causing a first connection message to be transmitted from a first network node comprising a command to connect to the first network node, and causing a second connection message to be transmitted from a second network node comprising a command to connect to the second network node.

In another embodiment, an apparatus may comprise: at least one processor; and at least one non-transitory memory including computer program code, the at least one memory and the computer program code configured to, with the at least one processor, cause the apparatus at least to perform: receive, by a first network node connected to a plurality of further network nodes of a wireless network, measurement information for each of a plurality of user equipments, wherein the measurement information is based on uplink signals transmitted from each of the plurality of user equipments in a first radio resource control state; maintain, for each of the plurality of user equipments, a set of candidate links and cell-specific uplink timing advance values based on the measurement information; in response to initiation of a random access procedure by a given one of the user equipments, select at least two of the further network nodes to be used in a multi-connectivity session for communicating with the given user equipment; and cause at least one connection message to be transmitted to the given user equipment comprising a command to connect to the at least two selected network nodes.

An example embodiment may be provided in a non-transitory program storage device, such as memory 194 shown in FIG. 1 for example, readable by a machine, tangibly embodying a program of instructions executable by the machine for performing operations. The operations may include: receiving, by a first network node connected to a plurality of further network nodes of a wireless network, measurement information for each of a plurality of user equipments, wherein the measurement information is based on uplink signals transmitted from each of the plurality of user equipments in a first radio resource control state; maintaining, for each of the plurality of user equipments, a set of candidate links and cell-specific uplink timing advance values based on the measurement information; in response to initiation of a random access procedure by a given one of the user equipments, selecting at least two of the further network nodes to be used in a multi-connectivity session for communicating with the given user equipment; and causing at least one connection message to be transmitted to the given user equipment comprising a command to connect to the at least two selected network nodes.

In another embodiment, an apparatus may comprise: means for receiving, by a first network node connected to a plurality of further network nodes of a wireless network, measurement information for each of a plurality of user equipments, wherein the measurement information is based on uplink signals transmitted from each of the plurality of user equipments in a first radio resource control state; maintaining, for each of the plurality of user equipments, a set of candidate links and cell-specific uplink timing advance values based on the measurement information; in response to initiation of a random access procedure by a given one of the user equipments, means for selecting at least two of the further network nodes to be used in a multi-connectivity session for communicating with the given user equipment; and means for causing at least one connection message to be transmitted to the given user equipment comprising a command to connect to the at least two selected network nodes.

Figure 7:
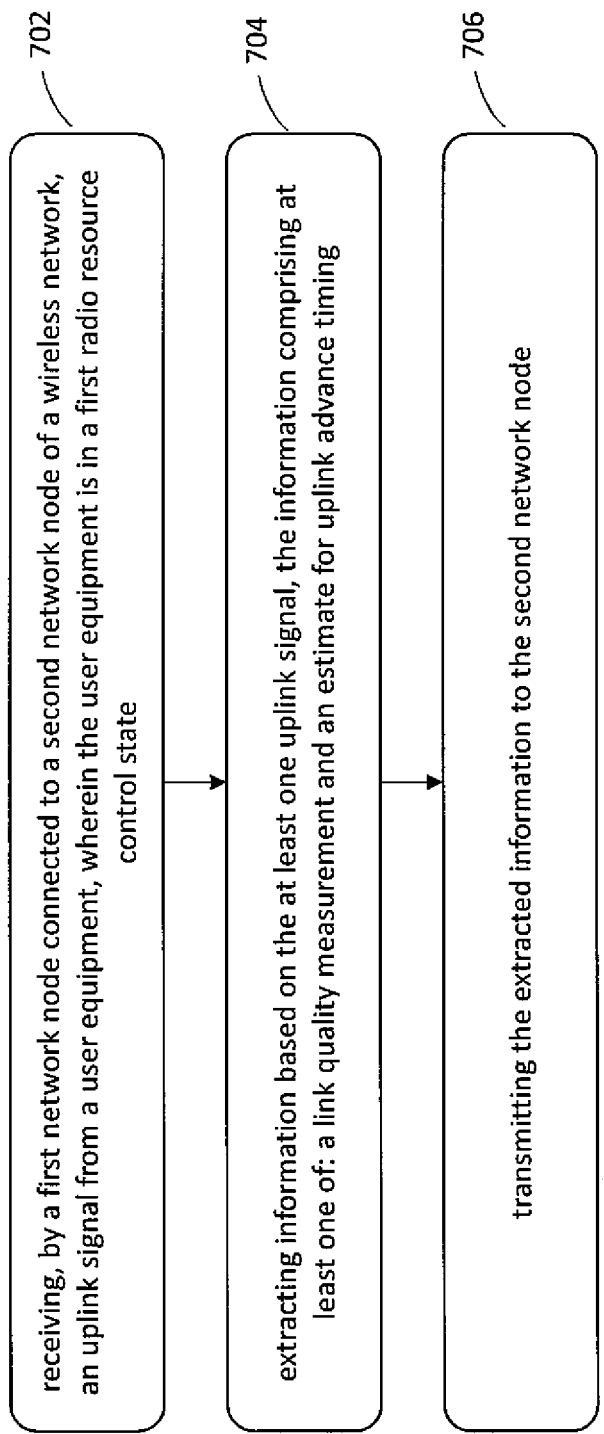

FIG. 7 is a logic flow diagram for fast activation of multi-connectivity utilizing uplink signals. This figure further illustrates the operation of an exemplary method, a result of execution of computer program instructions embodied on a computer readable memory, functions performed by logic implemented in hardware, and/or interconnected means for performing functions in accordance with exemplary embodiments. For instance, the determination module 150-1 and/or 150-2 may include multiples ones of the blocks in FIG. 7, where each included block is an interconnected means for performing the function in the block. The blocks in FIG. 7 are assumed to be performed by a distributed unit (e.g. eNB/DU 170), e.g., under control of the determination module 150-1 and/or 150-2 at least in part.

Referring to FIG. 7, an example method may comprise: receiving, by a first network node connected to a second network node of a wireless network, an uplink signal from a user equipment, wherein the user equipment is in a first radio resource control state as indicated by block 702; extracting information based on the at least one uplink signal, the information comprising at least one of: a link quality measurement and an estimate for uplink advance timing as indicated by block 704; and transmitting the extracted information to the second network node as indicated by block 706.

The first network node may be a distributed node, and the second network node may be a centralized node. Radio resource control protocol (RRC) and packet data convergence protocol (PDCP) may be located at the centralized network node, and at least the medium access layer (MAC) protocol and physical layer (PHY) protocol may be located at the second network node. The method may further comprise transmitting a connection message from the first network node to the user equipment, the connection message including a command to connect to at least the first network node as part of a multi-connectivity session. The method may further comprise receiving data from the user equipment in response to the connection message, wherein the user equipment is in a second radio resource control state. The received data may be received via a communication link comprising at least the first network node. Transmission of the connection message may be based at least on the uplink signal from the user equipment. The connection message may include cell-specific uplink timing advance value for the first network node. The first radio resource control state may be at least one of: an inactive state and a low activity state. The user equipment may be downlink synchronized with the first network node while the user equipment is in the first radio resource control state. The received at least one uplink signal may include a cell-specific timing shift.

In another embodiment, an apparatus may comprise: at least one processor; and at least one non-transitory memory including computer program code, the at least one memory and the computer program code configured to, with the at least one processor, cause the apparatus at least to perform: receive, by a first network node connected to a second network node of a wireless network, an uplink signal from a user equipment, wherein the user equipment is in a first radio resource control state; extract information based on the at least one uplink signal, the information comprising at least one of: a link quality measurement and an estimate for uplink advance timing; and transmit the extracted information to the second network node.

An example embodiment may be provided in a non-transitory program storage device, such as memory 155 shown in FIG. 1 for example, readable by a machine, tangibly embodying a program of instructions executable by the machine for performing operations. The operations may include: receiving, by a first network node connected to a second network node of a wireless network, an uplink signal from a user equipment, wherein the user equipment is in a first radio resource control state; extracting information based on the at least one uplink signal, the information comprising at least one of: a link quality measurement and an estimate for uplink advance timing; and transmitting the extracted information to the second network node.

In another example embodiment, an apparatus may comprise: means for receiving, by a first network node connected to a second network node of a wireless network, an uplink signal from a user equipment, wherein the user equipment is in a first radio resource control state; means for extracting information based on the at least one uplink signal, the information comprising at least one of: a link quality measurement and an estimate for uplink advance timing; and means for transmitting the extracted information to the second network node.

Without in any way limiting the scope, interpretation, or application of the claims appearing below, a technical effect of one or more of the example embodiments disclosed herein is significantly faster activation of multi-connectivity for an INACTIVE state UE compared to LTE. This is due to one or more of the following improvements: the network knows the best links at the time of initiating the connection resume, and therefore no time is spent on waiting for the UE measuring, averaging the measurement results and sending measurement report(s) for secondary link(s); the UE context is readily available at the central processing node, therefore there is no need for SeNB Addition Request signaling between nodes providing radio resources for multi-connectivity; in distributed deployments, the potential target 5G-NBs with secondary links can be prepared for fast activation of multi-connectivity; the UE location is known at a cell or TRP level, therefore the UE does not need to be paged for a mobile-terminated call; the timing advance values to the cells providing multi-connectivity are known in advance by the network, therefore random access is only needed in the case of mobile originated call to transmit connection resume message to the cell where the UE was initially camped to.

Another technical effect of one or more of the example embodiments disclosed herein is lower UE power consumption in CONNECTED_ACTIVE state. This is due to the increased utilization of multi-connectivity to convey small bursts of data, implying higher utilization of frequency domain resources, and ultimately higher UE power efficiency. In 3GPP document R2-165555, titled *Energy conserved operation evaluation*, Source: Huawei, HiSilicon, it was demonstrated that power consumption impact might not be significant due to relatively small contribution of beacon transmission for the overall power ramp-up/ramp-down process. However, it is noted that that beacon transmission may have some negative impact on the UE power efficiency of CONNECTED_INACTIVE state compared to IDLE state.

Another technical effect of one or more of the example embodiments disclosed herein is lower signaling overhead to activate multi-connectivity. For example, embodiments described herein allow most of the delays associated with the measurements and measurement reporting procedures to be avoided. Management of secondary links requires less signaling since the CU maintains a set of candidate links per UE, representing the preferred choices for a multi-connectivity session. Random access procedure towards secondary links to gain uplink synchronization can be avoided when CU maintains cell-specific uplink timing advance values per UE. When connectivity for data transmission/reception is needed, the secondary links can be activated immediately with a single RRCConnectionResume message, which includes a command to resume multi-connectivity to indicated cells. This message comprises cell-specific timing advance value(s) to be applied for subsequent UL transmissions.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171, 194 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

eNB (or eNodeB) Evolved Node B (e.g., an LTE base station)
3GPP 3$^{rd}$ generation partnership project
CU Centralized Unit
DRX Discontinuous Reception
DU Distributed Unit
eMBB Extreme Mobile Broadband
I/F Interface
LTE Long Term Evolution
LTE-Advanced Long Term Evolution-Advanced
MM Mobility Management
MME Mobility management entity
MeNB Master eNB
NCE Network Control Element
NR New Radio, 5G
N/W Network
PDCCH Physical Downlink Control Channel
RRC Radio resource control
RRH Remote radio head
Rx Receiver
SeNB Secondary eNB
S-SeNB Source SeNB
SGW Serving gateway
T-Se-NB Target SeNB
TRP Transmission/Reception Point
TTT Time To Trigger
Tx Transmitter
UDN Ultra Dense Network
URLLC Ultra-Reliable low latency communications
UE User Equipment (e.g., a wireless, typically mobile device)

What is claimed is:

1. An apparatus comprising:
   at least one processor; and
   at least one non-transitory memory including computer program code, the at least one memory and the computer program code configured, with the at least one processor, to cause the apparatus at least to perform:
   transmit at least one uplink signal to a plurality of network nodes of a wireless network based at least on the apparatus being in a first radio resource control state after suspending a multi-connectivity session such that the apparatus maintains connectivity with one of the network nodes, wherein the first radio resource control state is at least one of an inactive state and a low activity state;
   receive at least one connection message comprising a command to connect to at least two of the network nodes for communication;
   in response to the at least one connection message comprising the command to connect to at least two of the network nodes for communication, change from the first radio resource control state to a second radio resource control state; and
   transmit data utilizing multiple communication links via the at least two network nodes,
   wherein the apparatus is the user equipment.

2. The apparatus of claim 1,
   wherein the apparatus maintains connectivity based on cell-reselection parameters configured by the wireless network and downlink measurements.

3. The apparatus of claim 2, wherein:
   the first radio resource control state is an RRC_CONNECTED_INACTIVE state; and
   the second radio resource control state is an RRC_CONNECTED state.

4. The apparatus of claim 1, wherein the at least one memory and the computer program code are configured, with the at least one processor, to cause the apparatus at least to perform:
- initiate a random access procedure at least by transmitting a request message towards the network node with which the apparatus maintains connectivity.

5. The apparatus of claim 4, wherein initiation of the random access procedure is performed in response to determination of a need to transmit uplink data to the wireless network, and
- wherein an initial uplink message of the random access procedure comprises the request message.

6. The apparatus of claim 1, wherein the apparatus is downlink synchronized with each of the plurality of network nodes while the apparatus is in the first radio resource control state.

7. The apparatus of claim 1, wherein the at least one uplink signal comprises a cell-specific timing shift.

8. The apparatus of claim 1, wherein the at least one connection message comprises cell-specific uplink timing advance values for each of the at least two network nodes.

9. The apparatus of claim 1, wherein each of the plurality of network nodes is connected to a centralized network node, and
- wherein radio resource control protocol (RRC) and packet data convergence protocol (PDCP) are located at the centralized network node, and at least the medium access layer (MAC) protocol and physical layer (PHY) protocol are located at the plurality of network nodes.

10. The apparatus of claim 1, wherein the at least one uplink signal comprises an uplink beacon signal.

11. A method comprising:
- transmitting, by a user equipment, at least one uplink signal to a plurality of network nodes of a wireless network based at least on the user equipment being in a first radio resource control state after suspending a multi-connectivity session such that the user equipment maintains connectivity with one of the network nodes, wherein the first radio resource control state is at least one of an inactive state and a low activity state;
- receiving at least one connection message comprising a command to connect to at least two of the network nodes for communication;
- in response to the at least one connection message comprising the command to connect to at least two of the network nodes for communication, changing from the first radio resource control state to a second radio resource control state; and
- transmitting data utilizing multiple communication links via the at least two network nodes.

12. The method of claim 11,
- wherein the user equipment maintains connectivity based on cell-reselection parameters configured by the wireless network and downlink measurements.

13. The method of claim 11, further comprising:
- initiating a random access procedure at least by transmitting a request message towards the network node with which the user equipment maintains connectivity.

14. A non-transitory computer readable medium comprising computer program code stored thereon, which when executed by a user equipment, causes the user equipment to perform the method of claim 11.

* * * * *